July 16, 1946.  F. H. HAGNER  2,403,920
NAVIGATION AND INSTRUCTION INSTRUMENT
Filed Nov. 20, 1942  3 Sheets-Sheet 1
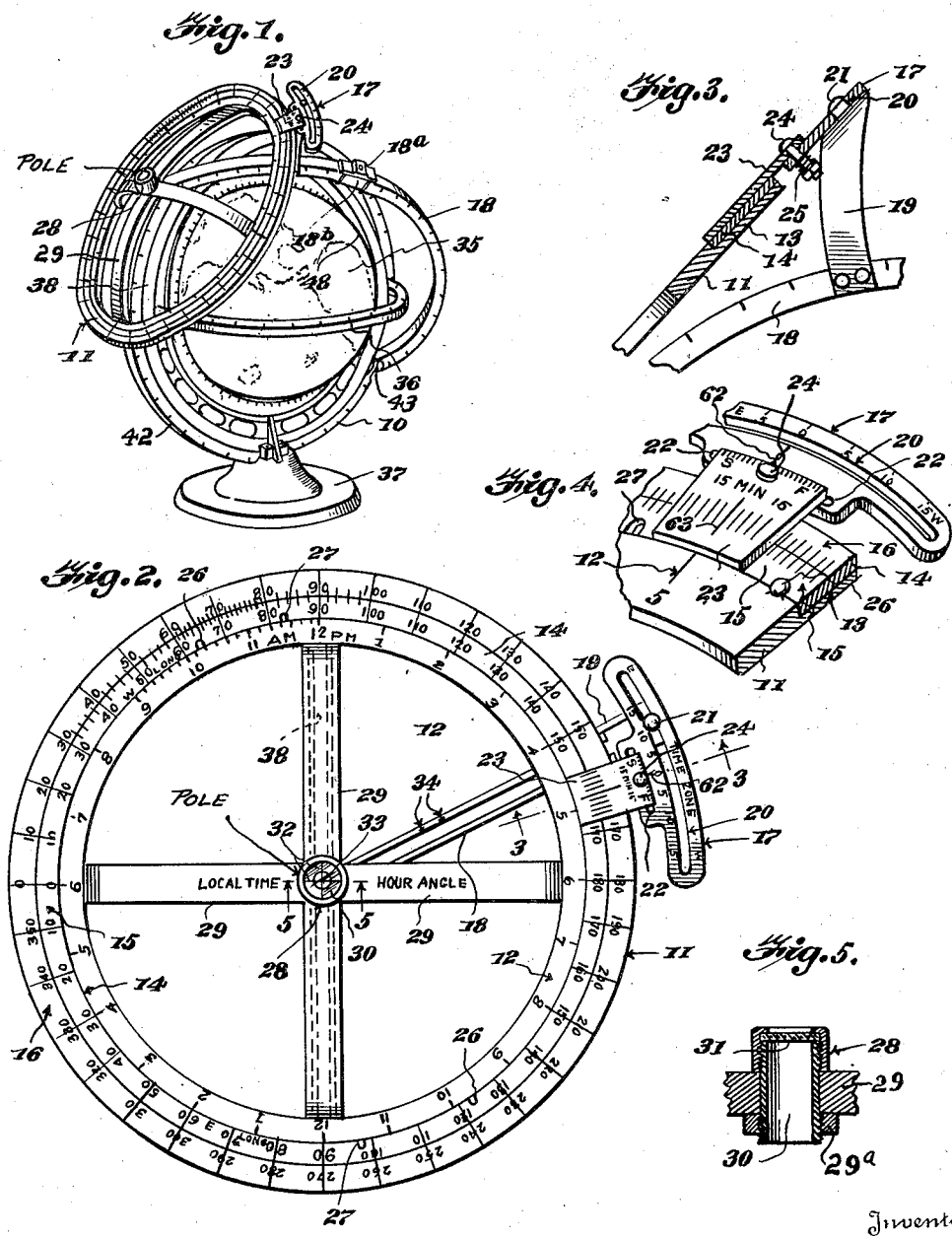
Inventor
FREDERICK H. HAGNER

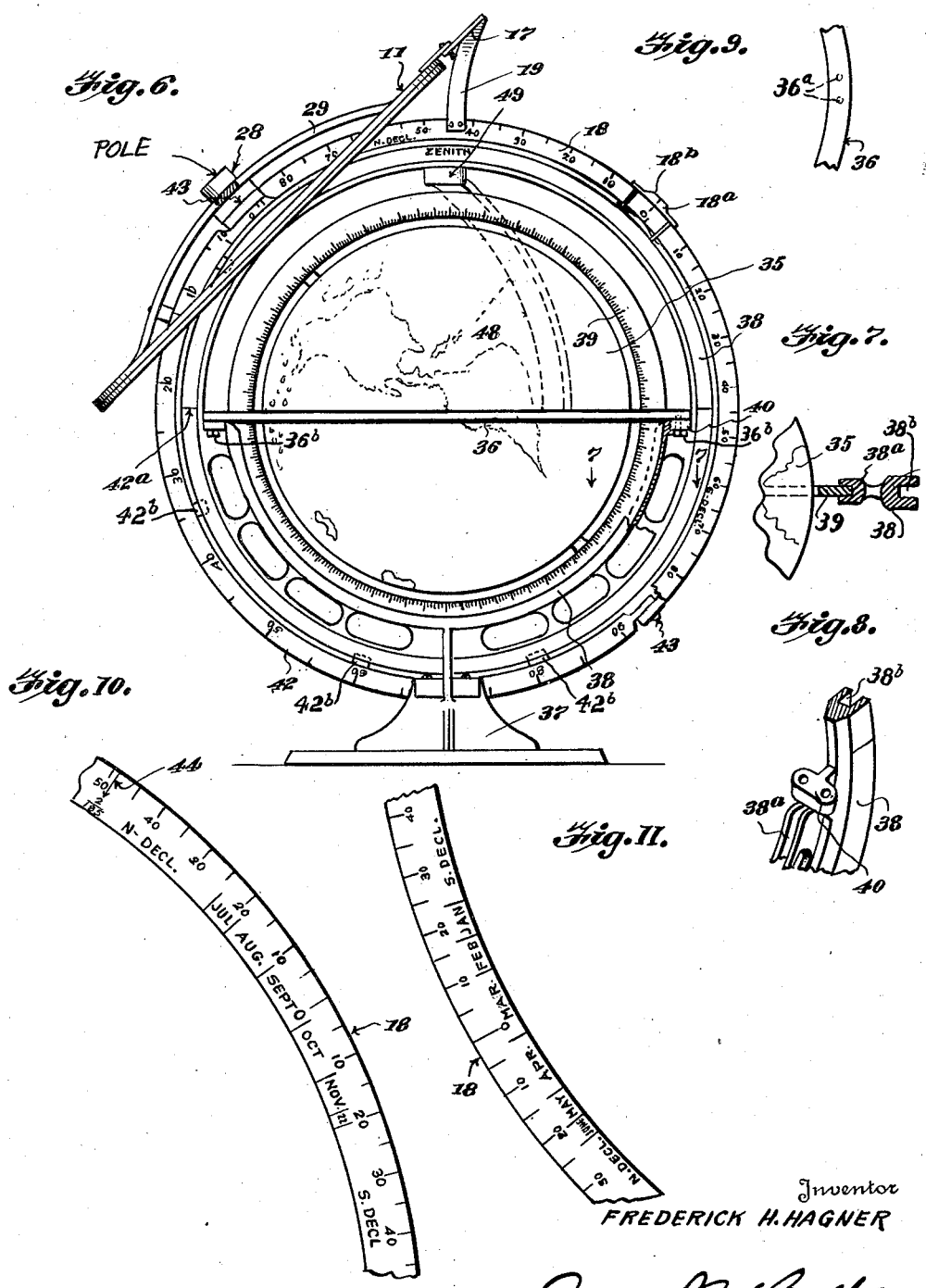

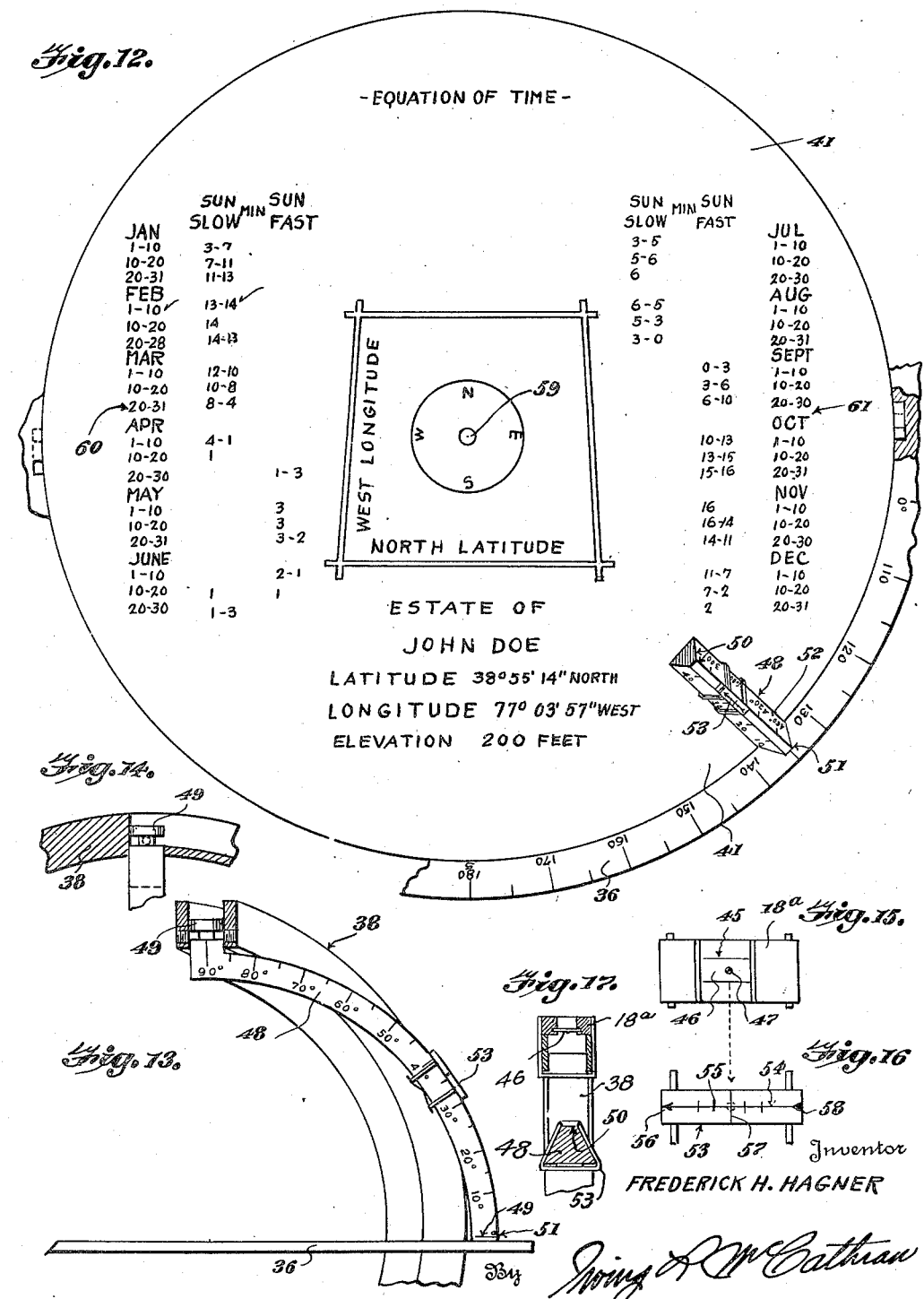

Patented July 16, 1946

2,403,920

UNITED STATES PATENT OFFICE 2,403,920

NAVIGATION AND INSTRUCTION INSTRUMENT

Frederick H. Hagner, San Antonio, Tex., assignor to Position Finder Corporation, San Antonio, Tex., a corporation of Texas Application November 20, 1942, Serial No. 466,310

5 Claims. (Cl. 35—46)

This invention relates to a navigation and instruction instrument, and constitutes an improvement upon my previous Patents #2,064,061 and #2,064,062, issued December 15, 1936.

One of the principal objects of the present invention is the production of a simple and efficient indicating and measuring means for use upon a navigating instrument of the type described in the above referred-to patents.

A further object of this invention is the production of a simple and efficient means located at the elevated pole of the instrument to facilitate the adjustment of the instrument to a selected position whereby the pole may be positioned over a selected point upon the globe of the instrument.

Other objects and advantages of the present invention will appear throughout the following specification and claims.

In the drawings:

Figure 1 is a perspective view of the instrument with a globe in position;

Figure 2 is a plan view of the instrument showing an azimuth bearing circle in position;

Figure 3 is a vertical sectional view taken on line 3—3 of Figure 2;

Figure 4 is a sectional perspective view of a portion of the local hour angle, ring, and time zone indicator;

Figure 5 is a vertical sectional view taken on line 5—5 of Figure 2;

Figure 6 is a side elevational view of the instrument with a globe in position;

Figure 7 is a horizontal sectional view taken on line 7—7 of Figure 6;

Figure 8 is a sectional perspective view of a portion of the supporting ring;

Figure 9 is a fragmentary top plan view of the azimuth ring;

Figure 10 is an enlarged fragmentary side elevational view showing the scale on the side of the declination arc;

Figure 11 is an enlarged side elevational view showing the graduations on the opposite side of the declination arc;

Figure 12 is a top plan view of the azimuth plate showing a portion of the azimuth ring;

Figure 13 is a sectional perspective view illustrating a portion of the supporting ring and the altitude and great circle arc;

Figure 14 is a fragmentary longitudinal sectional view through a portion of the supporting ring and showing a portion of the altitude arc journaled therein;

Figure 15 is a top plan view of the declination slide carried by the declination arc;

Figure 16 is a top plan view of the altitude slide which is carried by the altitude and great circle arc;

Figure 17 is a transverse sectional view showing the relative positions of the declination slide and altitude slide when in registering or aligned relation.

By referring to the drawings, it will be seen that 10 designates the instrument which relates generally to the type of instruments disclosed in my previous patents above identified, wherein a local hour angle circle 11 forms a part thereof. This local hour angle circle 11 or arc is graduated to indicate a. m. and p. m. time, as shown near its inner portion, as at 12, and is provided with an inset ledge 13 upon which is mounted a ring 14. The ring 14 is provided with an inner graduated circle 15 indicating 180 degrees east, 180 degrees west, representing east and west longitude, as at 16, indicating 360 degrees representing Greenwich hour angle.

A time zone indicator 17 is carried upon the declination arc 18 by means of a support 19 and the time zone indicator 17 is adjustable laterally of the support 19 through the medium of the arc slot 20 through which the connecting pin 21 fits. The indicator 17 is provided with a second arc slot 22 near its inner edge. A vernier plate 23 overlies the slot 22 and a pin 24 which is carried by the plate 23 extends through the slot 22 for holding the parts together, a spring-pressed clamp 25 is carried by the under side of the indicator 17 to frictionally hold the vernier plate in an adjusted position. The vernier plate 23 is suitably graduated, as shown in Figure 3. The inner edge of the vernier plate 23 registers with the outer edge of the graduations 12 in overlying relation.

The arc 11 is provided with lugs 26 which overhang the inner edge of the ring 14 to hold the ring 14 upon the ledge 13. The ring 14 is provided with notches 27 which are adapted to be brought into registration with the lugs 26 by slight rotation of the ring 14 when it is desired to remove the ring 14, such as will be necessary when working problems south of the equator.

The elevated pole 28 which is carried by the hour angle arms 29, at their intersection, is provided with a central bore 30 extending throughout its entire length. A transparent disc 31 is carried by the upper or outer end of the pole 28. The disc 31 is provided with cross reference lines 32 and a circle 33 which is intersected by these lines 32, as shown in Figures 2 and 5. A nut 29ª is threaded upon the lower end of the elevated pole 28 to anchor the pole in place at the junction of the arms 29.

The base 37 carries the supporting ring 38 which is fixed thereto, and a latitude arc 42 is slidably mounted through the base 37 below the supporting ring 38. This latitude arc 42 is graduated from 0 to 90°. The declination arc 18 is pivoted at its ends to the ends of the latitude arc 42 as at 43, to allow the arc 18 to swing laterally relative to the arc 42. The declination arc 18 is graduated near the outer periphery on both sides from 0 at the center to 90° toward the opposite pivot points, as shown in Figure 6. The outer edge of the supporting ring 38 is slotted or is fork-shaped in cross-section as shown at 38$^b$ in Figures 7 and 8, to receive lugs 42$^b$ which are carried by the latitude arc 42. These lugs 42$^b$ are shown in Figure 6.

This arc 18 is graduated upon one side thereof near its inner periphery with lines indicating the angular movement of the sun during each month period for six months, both north and south declination—see Figure 10. The arc 18 is also graduated upon its opposite side near its inner periphery with lines indicating the angular movement of the sun during each month period over a space of the remaining six months time, both north and south declination—see Figure 11. The arc 18 carries any desired number of marks, such as the mark 44—see Figure 10 representing navigational stars listed in the nautical almanac. Directly below this line the star's reference number (i. e. 2) and its sidereal hour angle (i. e. 185) are engraved on the arc 18 adjacent the mark 44. The purpose of this mark is to identify the navigational stars. The declination and indicator slide 18$^a$ is movable on the arc 18 and represents the position of any selected celestial body in declination. In the center of the slide 18$^a$ on either side thereof is an etched line 18$^b$ which is to be brought into registration with the graduations on the arc 18 for determining the declination of the selected celestial. The two marked lines 34 formed on the declination arc 18 represent two pointer stars of the big dipper, which always point toward the North Star.

The declination arc 18, as stated above, carries the slide 18$^a$ which is frictionally held in an adjusted position, in any suitable manner, such for instance as by means of a spring or other means. This slide 18$^a$ is provided with an aperture 45 in which is fitted a transparent plate 46 having a reference dot 47 marked thereon at its center.

The altitude and great circle distance arc 48 is hung upon a suitable journal 49 carried by the supporting ring 38, as shown in Figures 13 and 14. This arc 48 is provided with a free lower end 49 which overlies the azimuth circle 36 and swings freely over this azimuth circle 36 for a full 360°. The arc 48 preferably tapers toward its outer face, as at 50, to constitute a pointer, as at 51—see Figure 12. The arc 48 is graduated upon one side from 0 to 90°—see Figure 13, and upon its opposite side it is marked to indicate nautical miles of a 90° arc—note 52 in Figure 12. A slide 53 is slidably mounted upon the arc 48 and may be frictionally held in a selected position by any suitable means such as a spring or the like. This slide 53 is provided with a longitudinally extending arrow 54 and cross graduations 55 one degree apart. The slide 18$^a$ is adapted to be moved to superimposed relation with respect to the slide 53 and when so aligned the position of the dot 47 with respect to the graduations 55 will give the observer his intercept in nautical miles by estimation, between his calculated position (represented by the dot 47) and the observed position taken from the observed altitude of the selected celestial body and transferred to slide 53 on the altitude arc 48. If, for instance, the dot 47 appears on the center line of the slide 53, as indicated in dotted lines in Figure 16, the observer knows that he is at the position for which he has the instrument set. If, however, the dot 47 appears one degree (the first line) to one side of the center, which is sixty miles toward or away from his assumed or dead reckoning position which is set up on the instrument and is represented by the dot 47, he knows the distance and direction of error and may change his course accordingly to compensate for this error. One arrow 56 points away from the center line 57, and the other arrow 58 on the line 54 points towards the center line 57 to indicate whether the observer's position is away from or toward the position that he has assumed.

When desired, the azimuth plate 41, shown in Figure 12, may be used in place of the world globe 35, by first removing the globe 35 and fitting the plate 41 in place. The plate 41 is held in position by means of lugs which fit in bayonet slots formed in the inner periphery of the ring 36—see Figure 12. The globe 35 is carried by the conventional globe supporting ring 39 and the lower half of this ring 39 fits in the shallow slot 38$^a$ of the supporting ring 38. This ring 39 may be lifted from the slot 38$^a$ and shifted from under the upper end of the altitude arc 48 thereby permitting the globe 35 to be easily removed after the ring 36 has also been removed. The upper end of the altitude arc 48 is spaced from the top of the ring 39 to permit of this movement. The ring 39 is of thin material and may be slightly flexed if desired to facilitate removal. It should be noted that the ring 36 is detachably secured to the lugs 40 by suitable bolts. The azimuth or reference plate 41 and the globe 35 constitute interchangeable celestial reference means, which plate and globe are removable and interchangeable and replaceable one with respect to the other, so that the plate 41 may be used with the instrument when desired, or the globe 35 may be used in place of the plate 41 after first removing the plate and replacing the same with the globe 35.

Suitable sockets 36$^a$ shown in dotted lines in Figure 9 may be provided in the under face of the ring 36 to receive the bolts 36$^b$ indicated in Figure 6.

The azimuth or reference plate 41 which may be substituted for the globe 35 is provided with a center spot 59 which is the geometric center of the instrument and always represents the observer's position as to latitude and longitude. This plate contains certain reference data, such as notations 60 from January to June constituting equations of time of the sun on one side of the center of the plate 41, as shown in Figure 12, and is provided with similar notations 61 in the other side of the center. For instance on February 10 the plate shows that the sun is fourteen minutes slow—note the check marks on Figure 12. If the sun is slow, the vernier plate 23 is moved to a point where the indicator point 62 carried by the time zone indicator registers with the fourteen-minute line on the slow or "S" side of the vernier plate 23. This will compensate for the sun being slow on that date by changing the position of line 63 relative to the point 62. The time zone indicator compensates for the difference between the meridian, such as Eastern time zone, for which Eastern time is set, and the distance in degrees of longitude east or west of the time zone meridian.

As an example the time zone indicator 17 may be moved to a position of 8° which is the difference between central time and the actual sun time where the observation is being made. If the observer is east of central time the indicator is moved west. If the observer is west of central time the indicator is moved east for a proper number of degrees to compensate for the difference between the sun time and his zone watch time. The combination of corrections made by the time zone indicator 17 and the vernier plate 23 (equation of time compensator) allows the observer to check his watch with the instrument at any time by observing the sun and also allows him to read the time of sunrise and sunset according to his watch at that location on the earth.

When a world globe is set in the supporting ring and the observer's geographical position is set directly under the zenith line on the supporting ring, the rays of light coming through the index slide on the declination arc will cast a spot of light on the world globe indicating the exact geographic position of the sun relative to the observer's position indicated at zenith.

By moving the indicator 53 on the altitude arc directly over this spot of light the distance between the observer's position and the geographical position of the sun is measured, as at 52, on the great circle side of this arc, and the pointer 51 gives the time azimuth of the sun.

In place of the world globe a star globe of the conventional type may be inserted having fixed stars located thereon. The elevated pole of this globe is placed in alignment with the elevated pole 28 of the instrument, and the longitudinal arc 42 is moved until the longitude of the observer is set at 12 noon. This is accomplished by rotating the ring 14 upon the local hour angle circle 11. A conventional chart appears upon this globe containing, months, date and time. When the proper date, month and time are set on the globe, the globe is then in a position whereby all of the stars which are above the horizon ring are visible at the location of the observer. By looking through the declination slide 18ª and focusing this slide on the selected celestial body on the globe (star), the declination arc will be moved relative to the Greenwich sidereal hour angle arc, thereby indicating the position in degrees of the sidereal hour angle of the star, and the position of the slide on the declination arc will indicate the declination of the star.

By intercepting the slide 18ª with the slide 53 on the altitude and great circle arc the position of the slide indicates the altitude of the star and the pointer 51 gives the measure in azimuth, and all of the elements in the astronomical triangle are set on the instrument by the position of these various arcs, from which readings may be obtained, thereby giving the solution of the astronomical triangle.

*To set up the instrument for demonstration of the motions of the universe: 1st sun.*—We are at a given location on the earth, San Antonio, Texas, latitude 29°30′, longitude 98°30′. First move latitude arc 42 until it reads 29°30′ opposite azimuth disc line 42ª. The pole 28 on instrument is then elevated to 29°30′ above this horizontal line. Turn longitude arc until 98°30′ west longitude is opposite marking 12 noon on hour angle arc 11.

The nautical almanac will give you the declination of the sun for any time and date. We will take August 10. The sun declination at 10:00 a. m. is 15° N. Now move slide 18ª which has a hole in the center to 18° N. on declination arc 18.

We now have the three necessary settings to proceed with our demonstration. Set the instrument out where the sun is shining and see that it is level. On the azimuth plate 41 there is set up the equation of time—six months on the west side and six months on the east side—see Figure 12.

Attached to the declination arc 18 is an indicator 17 which moves around the local hour angle arc and the longitude circle 14. The arc 18 swings laterally upon the pivots 42 and 43 and thereby permits the indicator 17 to move around the hour angle arc 11, since this indicator 17 is carried by the declination arc 18. There are two adjustments to make in order to check your watch time with the measured (actually measured by instrument) sun's angle of rays of light as they are cast upon the dome 59 in center of azimuth plate 41.

First slide zone time over to the longitude meridian to which your watch is set. In the case of San Antonio, Texas (west longitude 98°30′) we use central standard time which is 90° of west longitude. When the sun is on the 90° of west longitude then it is 12:00 o'clock noon all along that same meridian from the North Pole to the South Pole. It will take the sun 34 minutes before it will be on the meridian of San Antonio, Texas.

*2nd. Second slide—equation of time or vernier plate 23 to a proper position.*—Owing to the world revolving around the sun in an elliptic path instead of a circle, we have only two days when one revolution of our earth is 360°, March 21 and September 23. This is when the sun crosses the celestial equator (it is then at a zenith point to all those who are on our equator). On those two days everyone sees the sun rise due east and set due west. They also have the sun 12 hours above their horizon and 12 hours below.

The nautical almanac gives the equation of time (sun fast and slow) for each day in the year.

The azimuth plate 41 gives the equation of time for every ten day period and is sufficient for demonstration purposes. Plate gives sun equation of time for August 10. Set this off on the slide to compensate for the number of minutes it is fast. Now orient the instrument and at the same time move declination arc 18 until the hole in the slide 18ª on this arc is parallel with the sun's rays. This is done by watching the sun spot move until you have it centered on top of dome 59. Next move the altitude arc 48 until you intercept the rays of light that are cast upon the dome 59. The altitude of the sun can be seen on the arc 48. Then move slide 53 until the sun spot appears on cross line 57. The point where the line 57 registers with the degree scale on one side of the altitude arc 48 gives you the altitude of the sun at that given time when the observation is being made. The pointer 51 at the end of this arc 48 indicates the true azimuth of the sun.

When this is accomplished you have the astronomical triangle from which all celestial navigation problems are solved.

What I have done is to set up the arcs to a position which will follow the angle of the rays of light from the sun throughout the day.

The following information is obtained when the instrument is set in this position:

1. Gives the sun's observed altitude (correct for refraction).
2. Gives sun's true azimuth bearing.
3. Gives sun's local hour angle.
4. Gives sun's Greenwich hour angle.
5. Gives sun's apparent time.
6. Gives sun's mean time (equation slide takes care of difference noted on plate).
7. Gives means of checking watch directly.
8. Gives watch time sun will appear on eastern horizon and set on western horizon.
9. Gives degrees and fraction of a degree before sun will reach 180 meridian start.
10. Gives sun's azimuth bearing and altitude bearing from time of sunrise to time of sunset.
11. Allows a demonstration of the rate of speed of change in altitude in reference to azimuth. Azimuth changes are slow when sun is at a low altitude and it changes very fast in azimuth when the sun is at high altitude.
12. Shows at what latitude and longitude the sun is directly overhead (zenith) point.
13. Measures the amount of change in azimuth and altitude for any period of time that the sun is above the horizon.
14. Shows what time it is all over the world.
15. Shows the observer's meridian.
16. Shows how the sun changes its declination. How the sun changes its positions during the twelve months of the year.

It should be understood that, if desired, the instrument may be made large enough for a student to position himself within the instrument so that he may visualize the celestial sphere and the position of a selected celestial body. In other words, the student may take the position of the azimuth dome at the center of the azimuth plate relative to the respective arcs of the instrument and actually visualize the measurement of the angle of light from a selected celestial body relative to his own position. This may be done without departing from the spirit of the invention.

Having described the invention, what I claim as new is:

1. An instrument of the class described comprising a support, a declination arc slidable upon said support, a pole located on said declination arc, a removable and replaceable celestial reference means carried by said support, a local hour angle circle rotatable about said pole in a plane at right angles to said declination arc, an azimuth scale carried by the support, and an altitude arc suspended from said support centrally of said celestial reference means and having means moving over said azimuth scale for indicating azimuth of a body observed.

2. An instrument of the class described comprising a support, a declination arc slidable upon said support, a pole located on said declination arc, a removable and replaceable world globe carried by said support, a local hour angle circle rotatable about said pole in a plane at right angles to said declination arc, an azimuth scale carried by the support, an altitude arc suspended from said support centrally of said globe and having means moving over said azimuth scale for indicating azimuth of a body observed, said support having a channel therein, a globe supporting ring slidable in and removable from said channel to permit removal and adjustment of the globe.

3. An instrument of the class described comprising a declination arc mounted for rotating movement in a substantially vertical direction, the declination arc being divided into a plurality of horizontally pivoted sections whereby one section may be swung laterally relative to the other section, a sighting device adjustable upon the swinging section; a celestial reference means located within the radius of the declination arc, the pivots of the sections of the declination arc representing opposite poles, a measuring circle extending in a plane at right angles to the declination arc graduated for east and west longitude and also for local time, said measuring circle being journaled at one horizontal pivot of the declination arc representing one pole and rotatable about the pole, an equation of time scale adjustable about the measuring circle, an azimuth scale surrounding said celestial reference means, and an altitude and great circle arc centrally supported above said celestial reference means and movable circumferentially around the chart and azimuth scale.

4. An instrument of the class described comprising a declination arc mounted for rotating movement in a substantially vertical direction, the declination arc being divided into a plurality of horizontally pivoted sections whereby one section may be swung laterally relative to the other section, a sighting device adjustable upon the swinging section; a celestial reference means located within the radius of the declination arc, the pivots of the sections of the declination arc representing opposite poles, a measuring circle extending in a plane at right angles to the declination arc graduated for east and west longitude and also for local time, said measuring circle being journaled at one horizontal pivot of the declination arc representing one pole and rotatable about the pole, an equation of time scale adjustable about the measuring circle, an azimuth scale surrounding said celestial reference means, an altitude and great circle arc centrally supported above said celestial reference means and movable circumferentially around the celestial reference means and azimuth scale, and said altitude and great circle arc having a pointer overlying the azimuth scale for indicating the position of the altitude and great circle arc in degrees in azimuth, the altitude and great circle arc having scales indicating degrees and also nautical miles.

5. An instrument of the class described comprising a time and hour angle circle formed of a plurality of sections, a pivot member constituting a pole connecting two of the sections, said circle being movable in a vertical plane for raising and lowering the pole, a celestial reference means located within the circle, the pivot member having a bore therethrough, and sighting means carried by the pivot means to facilitate the positioning of the sighting means upon a selected location upon said celestial reference means as an operator views a selected location upon said celestial reference means through said bore.

FREDERICK H. HAGNER.